United States Patent [19]

Taylor

[11] Patent Number: 5,269,614
[45] Date of Patent: Dec. 14, 1993

[54] SPRAY HEAD FOR LUBRICATING CHAIN DRIVES

[76] Inventor: Jason R. Taylor, 614 Langside Ave., Coquitlam, Canada

[21] Appl. No.: 836,068

[22] Filed: Feb. 13, 1992

[51] Int. Cl.⁵ .......................... F16N 5/00; F16N 7/00
[52] U.S. Cl. ........................................ 401/9; 401/11;
401/190; 184/15.1; 239/76; 239/565
[58] Field of Search ............. 222/182, 402.12, 402.13;
239/76, 565, 562, 548; 401/11, 190, 9; 184/15.1

[56] References Cited

U.S. PATENT DOCUMENTS

| | | | |
|---|---|---|---|
| 2,930,061 | 3/1960 | O'Neil | 401/11 |
| 3,270,966 | 9/1966 | Ackley | 239/565 |
| 3,828,890 | 8/1974 | Schott et al. | 184/15.1 |
| 3,934,677 | 1/1976 | Schott et al. | 184/15.1 |
| 3,991,918 | 11/1976 | McNamara et al. | 239/76 X |
| 4,572,435 | 2/1986 | Thompson | 239/565 X |
| 4,709,717 | 12/1987 | Rannigan et al. | 401/11 X |
| 4,783,186 | 11/1988 | Manning et al. | 401/190 |
| 4,815,637 | 3/1989 | Nellis | 222/402.12 |
| 5,020,637 | 6/1991 | Hoenselaar et al. | 184/15.1 |

FOREIGN PATENT DOCUMENTS 1017427 10/1957 Fed. Rep. of Germany ..... 184/15.1

Primary Examiner—Andres Kashnikow
Assistant Examiner—Anthoula Pomrening
Attorney, Agent, or Firm—Klarquist, Sparkmanm, Campbell, Leigh & Whinston

[57] ABSTRACT

A spray head adapted for directing an aerosol lubricant onto the wear points of a drive chain, such as a motorcycle chain. The spray head is designed to receive a supply tube connectable to the outlet port of an aerosol can. The spray head includes a recessed portion having a pair of concave cavities each having a fluid outlet for dispensing lubricant directly onto the lateral link plates of the chain, and a central protrusion having a planar guide surface adapted for travelling over the upper surfaces of the chain rollers.

9 Claims, 1 Drawing Sheet

SPRAY HEAD FOR LUBRICATING CHAIN DRIVES

FIELD OF THE INVENTION

This application relates to a spray head for dispensing an aerosol lubricant directly onto the critical wear points of a drive chain. The spray head is designed to receive a supply tube connectable to the outlet port of an aerosol can.

BACKGROUND OF THE INVENTION

The chains of chain-driven vehicles such as motorcycles and bicycles should be periodically lubricated to reduce wear and enhance performance. Chain lube is typically sold in aerosol cans together with straw-like supply tubes connectable to the outlet port of the can. If the lubricant is sprayed directly from the can's outlet port, substantial overspray typically results, even if the user endeavors to direct the lubricant to the critical wear points of the chain, such as the end portions of the roller pins between the lateral link plates. Accordingly a significant percentage of the lubricant is dispersed into the air in the vicinity of the chain. Application of the lubricant to the critical wear points of the chain may be more easily controlled if the supply tube attachment is used, but it is a time consuming and painstaking task to lubricate an entire chain in this fashion.

Some spray head attachments adapted for delivering lubricant directly to the wear points of a drive chain are known in the prior art. U.S. Pat. No. 4,815,637, which issued to Nellis on Mar. 28, 1989, discloses a cap assembly for use with canned aerosol lubricant which is designed to direct a foam lubricant between the lateral link plates of a drive chain. The Nellis cap assembly includes a cap for engaging the upper end of a can of aerosol lubricant and an arm extending radially from the cap for delivering lubricant from the can's spray head to a distal outlet head. The distal outlet head has a recessed portion having a length slightly greater than the width of a drive chain to facilitate placement of the outlet overlying the chain. Lubricant from the aerosol can is expelled through a pair of holes formed in the outlet head directly onto the drive chain.

The Nellis design has various shortcomings which are overcome in the present invention. The Nellis outlet head is but one element of an overall cap assembly and is not intended to be used solely with supply tubes sold together with aerosol lubricants. The cap portion and radial arm of the Nellis invention can hinder placement of the outlet head on hard-to-reach portions of the drive chain. Further, the shape of the recess formed in the Nellis outlet head does not facilitate rapid travel of the head over the chain's rollers or prevent overspray onto the central portions of the rollers. Additionally, the formation of the boreholes drilled in the Nellis outlet head causes differential flow of lubricant through the outlet apertures, resulting in uneven application of the lubricant to the chain.

Accordingly, the need has arisen for a spray head connectable to the outlet port of an aerosol can which is specifically shaped to efficiently direct aerosol lubricant to the wear points of a drive chain.

SUMMARY OF THE INVENTION

In accordance with the invention there is provided a spray head connectable to a conduit in communication with the outlet port of an aerosol can and adapted for dispensing lubricant dispensed from the outlet port onto a drive chain. The spray head comprises a solid body having a recessed portion formed therein for receiving the drive chain, the recessed portion having first and second cavities separated by a central protrusion. Fluid delivery means is provided within the solid body and includes an inlet chamber for removably receiving one end of the conduit and first and second outlets in communication with the inlet chamber for dispensing lubricant into the first and second cavities respectively. The fluid delivery means is configured so that the decrease in fluid pressure between the inlet chamber and the first and second outlets is substantially equal.

The solid body is preferably parallelepiped-shaped and the recessed portion is formed in the undersurface thereof.

Preferably, the fluid delivery means is configured such that the length of fluid travel from the inlet chamber to the first and second outlets is substantially equal. Advantageously the fluid delivery means may include a primary borehole in communication with the inlet chamber and extending downwardly within a central portion of the body and first and second secondary boreholes of substantially equal length in communication with the central borehole and diverging laterally therefrom in opposite directions, the first and second boreholes being in communication with the first and second outlets respectively.

The solid body preferably has opposed end walls bounding the recessed portion such that the first and second cavities are defined by one of the end walls and the central protrusion.

The spray head is adapted for overlying a drive chain having a plurality of rollers and pairs of lateral plates for linking the rollers. The central protrusion has a planar guide surface adapted for travel over the upper surfaces of the rollers and the first and second outlets are adapted for dispensing lubricant directly onto the lateral link plates. The first and second outlets are preferably located on an upper surface of respective first and second cavities and are spaced a short distance directly above the lateral link plates when the planar guide surface travels over the roller upper surfaces as described aforesaid.

Advantageously, the inlet chamber is adapted to snugly receive conduits of varying diameters.

BRIEF DESCRIPTION OF THE DRAWINGS

In drawings which illustrate an embodiment of the invention, but which should not be construed as restricting the spirit or scope of the invention in any way.

DETAILED DESCRIPTION OF THE PREFERRED EMBODIMENT

Figure 1:
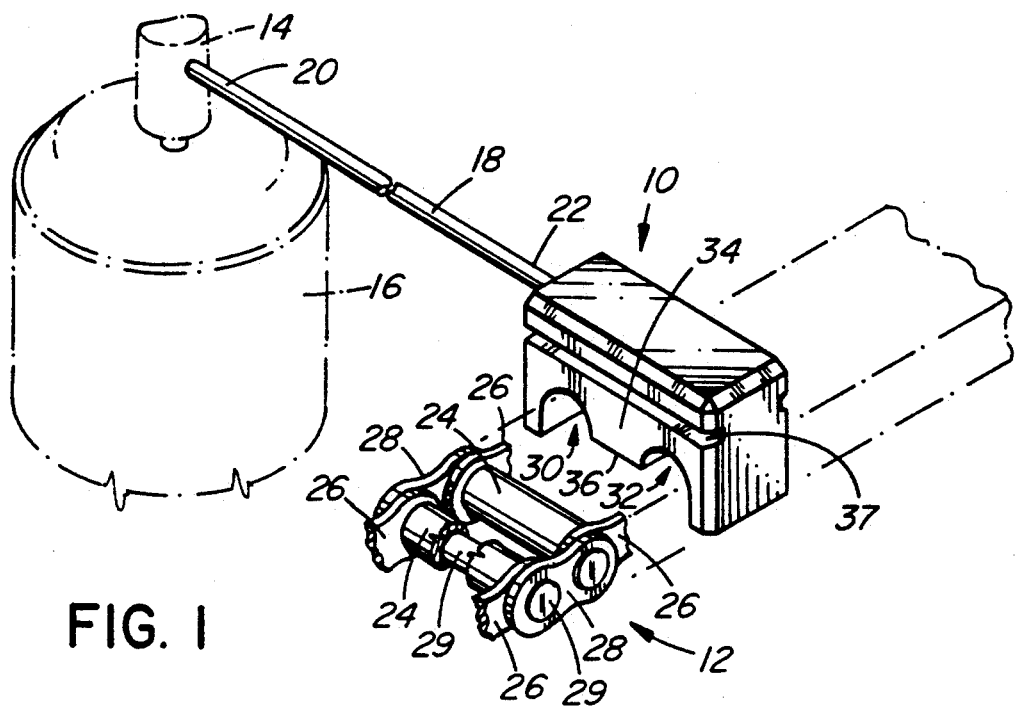
FIG. 1 is an isometric view of the spray head of the present invention overlying a portion of a drive chain and connected to an outlet of an aerosol can by means of a semi-rigid supply tube.
Figure 2:
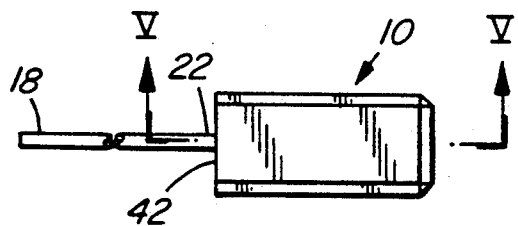
FIG. 2 is a top, plan view of the spray head of FIG. 1.

With reference to FIG. 1, this application relates to a spray head 10 adapted for delivering lubricant to the wear points of a drive chain 12, such as a motorcycle or bicycle chain. Spray head 10 may be readily connected to the outlet 14 of an aerosol can 16 by means of a straw-like fluid supply tube 18. Supply tube 18 is ordinarily sold together with aerosol can 16 and does not form part of the invention. One end 20 of supply tube 18 is inserted in the aerosol can outlet 14 and the opposite end 22 is inserted into an inlet chamber 40 formed within spray head 10, as discussed further below.

Figure 5:
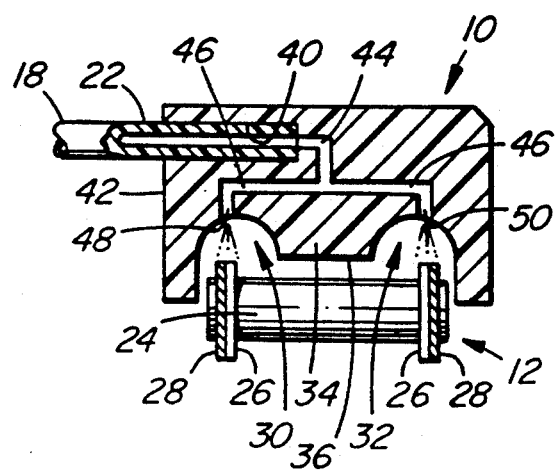
FIG. 5 is a longitudinal sectional view taken along section lines V—V of FIG. 2.

As shown in FIGS. 1 and 5, spray head 10 is shaped to overlie a conventional drive chain 12. Chain 12 includes a plurality of rollers 24 coupled together by roller link plates 26. Each roller 24 surrounds a roller pin 29. The lateral ends of roller pins 29 are coupled to pin link plates 28 which join pairs of roller link plates 26 together. The critical wear points of most drive chains 12 are the lateral portions of roller pins 29 between the roller and pin link plates 26, 28. Accordingly, spray head 10 is designed to direct lubricant directly to this area of drive chain 12 while at the same time limiting overspray onto the central portions of rollers 24.

Figure 4:
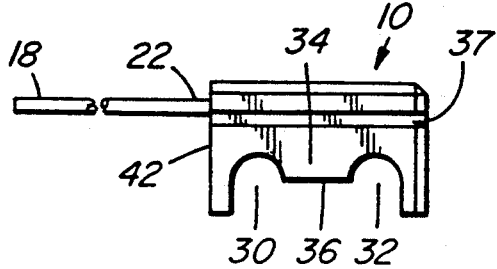
FIG. 4 is a right side elevational view of the spray head of FIG. 1.

Spray head 10 is generally parallelepiped in shape and has a recess formed in its bottom surface which is dimensioned to receive chain 12 (FIG. 1 and 5). The recess includes two concave cavities 30 and 32 separated by a central protrusion 34 (FIG. 4). Central protrusion 34 has a planar guide surface 36 adapted to travel over the central, upper surfaces of chain rollers 24 as the lubricant is applied (FIG. 5).

The opposite side surfaces of head 10 have cored-out portions 37 to facilitate gripping of spray head 10 (FIGS. 1 and 4).

As shown best in FIG. 5, spray head 10 has a series of internal chambers for channelling lubricating fluid from supply tube 18 to chain 12. A chamber 40 having an inlet end on the rear wall 42 of spray head 10 is provided for receiving one end 22 of supply tube 18. Chamber 40 may be countersunk to securely receive supply tubes 18 of varying diameters.

Figure 3:
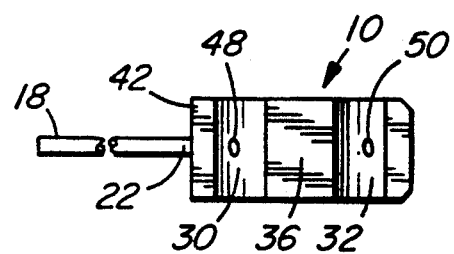
FIG. 3 is a bottom, plan view of the spray head of FIG. 1.

Chamber 40 is in communication with a primary borehole 44 which branches in a T-shaped formation into two separate secondary boreholes 46 of equal length, which terminate in spray outlets 48 and 50. Spray outlets 48, 50 empty into concave cavities 30, 32 respectively as shown best in FIGS. 3 and 5. Preferably spray outlets 48 and 50 are centered on the arcuate upper surfaces of respective cavities 30 and 32.

Primary and secondary bores 44, 46 are drilled in the T-shaped formation as described aforesaid to ensure even flow of lubricating fluid through outlets 48, 50. That is, since secondary boreholes 46 are of equal length and diameter, the decrease in fluid pressure from inlet chamber 40 to outlet 48 is substantially equivalent to the decrease in fluid pressure from chamber 40 to outlet 50. This ensures that lubricant is expelled from outlets 48,50 at a substantially even flow rate, unlike some prior art designs.

The design of chamber 40 and primary and secondary bores 44, 46 also facilitates the optimum degree of foaming of fluid lubricant within head 10.

In operation, most chain lubricants are sold in aerosol cans 16 having spray outlets 14. Ordinarily semi-rigid supply tube attachments 18 are sold together with aerosol lubricant to facilitate application of the lubricant into hard-to-reach locations. To use spray head 10 of the present invention, the operator first inserts one end 20 of supply tube 18 into the spray outlet 14 of aerosol can 16. The other end 22 of supply tube 18 is then inserted into the inlet end of chamber 40 formed in the rear wall 42 of spray head 10. As discussed above, chamber 40 is preferably countersunk to receive supply tubes 18 of varying diameter.

Once supply tube 18 is securely inserted into chamber 40 as described above, the operator need only place spray head 10 overlying the chain 12 to be lubricated and press the outlet 14 of can 16. Typically the chain 12 is manually or mechanically rotated while the lubricant is applied. Alternatively, spray head 10 may be passed over a stationary chain 12. The planar surface 36 of central protrusion 34 acts as a guide which slidingly engages the upper surfaces of rollers 34 as spray head 10 and drive chain 12 move relative to one another.

Lubricant is expelled from can outlet 14 through supply tube 18 into spray head 10 whereupon it travels through primary and secondary bores 44, 46. The lubricant is expelled through spray outlets 48 and 50 as shown in FIG. 5 directly onto the lateral link plates 26, 28 of chain 12. The shape of the spray head recess causes the lubricant to circulate within concave cavities 30, 32 as it is expelled; central protrusion 34 acts as a barrier substantially preventing flow of lubricant onto the central portions of rollers 24. Thus the lubricant is concentrated on the critical wear areas of the chain 12 and wasteful overspray is substantially reduced.

As will be apparent to those skilled in the art in the light of the foregoing disclosure, the dimensions and shape of spray head 10 may be modified to suit drive chains 12 of different types and sizes. For example, spray head 10 may be adapted for use in industrial applications to lubricate chain driven machinery in addition to vehicles such as motorcycles or bicycles. Many alterations and modifications are possible in the practice of this invention without departing from the spirit or scope thereof. Accordingly, the scope of the invention is to be construed in accordance with the substance defined by the following claims.

What is claimed is:

1. A spray head for directing lubricant onto a drive chain having a plurality of rollers and a plurality of lateral plates for linking said rollers together, said spray head comprising:

(a) a solid body having a recess formed in a bottom portion thereof for receiving said chain, wherein said recess is defined by opposed end walls and a bottom wall extending between said end walls, said bottom wall comprising a guide surface projecting downwardly from a central portion of said body for slidingly engaging said rollers and first and second upwardly concave surfaces extending between said guide surface and an adjacent end wall, said first and second concave surfaces defining respective first and second cavities on opposite sides of said guide surface;

(b) an inlet formed in said body for removably receiving one end of a conduit connectable to the outlet port of an aerosol can;

(c) a first outlet formed on said first concave surface for dispensing lubricant into said first cavity;

(d) a second outlet formed on said second concave surface for dispensing lubricant into said second cavity; and (e) fluid delivery means within said body for delivering lubricant from said inlet to said first and second outlets such that the decrease in fluid pressure between said inlet and said first and second outlets is substantially equal.

2. The spray head as defined in claim 1, wherein said fluid delivery means is configured such that the length of fluid travel from said inlet to said first and second outlets is substantially equal.

3. The spray head as defined in claim 2, wherein said fluid delivery means further comprises:
   (a) a primary borehole in communication with said inlet and extending downwardly with said central portion of said body; and
   (b) first and second secondary boreholes of equal length in communication with said primary borehole and diverging laterally therefrom in opposite directions, wherein said first and second secondary boreholes are in communication with said first and second outlets respectively.

4. The spray head as defined in claim 1, wherein said first and second outlets are located at the vertices of said first and second concave surfaces respectively.

5. The spray head as defined in claim 1, wherein said outlets are spaced above said lateral link plates when said guide surface contacts an upper portion of said chain rollers.

6. The spray head as defined in claim 5, wherein said guide surface is substantially planar.

7. A spray head for directing lubricant onto a drive chain having a plurality of rollers and a plurality of lateral plates for linking said rollers together, said spray head comprising:
   (a) a solid body having a recess formed in a bottom portion thereof for receiving said chain, wherein said recess is defined by opposed end walls and a bottom wall extending between said end walls, said bottom wall comprising a central portion projecting downwardly for slidingly engaging said rollers and first and second lateral portions defining first and second cavities on opposite sides of said central portion between said central portion and an adjacent end wall;
   (b) an inlet formed in said body for removably receiving one end of a conduit connectable to the outlet port of an aerosol can;
   (c) a first outlet formed on said first lateral portion for dispensing lubricant into said first cavity;
   (d) a second outlet formed on said second lateral portion for dispensing lubricant into said second cavity; and
   (e) fluid conduit means within said body for delivering lubricant from said inlet to said first and second outlets, wherein said conduit means is configured such that the decrease in fluid pressure between said inlet and said first and second outlets is substantially equal, wherein said first and second outlets are spaced above said lateral link plates when said central portion contacts an upper portion of said chain rollers.

8. The spray head as defined in claim 7, wherein said central portion comprises a substantially planar guide surface for slidingly engaging said rollers.

9. The spray head as defined in claim 8, wherein said first and second lateral portions are upwardly concave and wherein said first and second outlets are formed at the vertices of said first and second lateral portions respectively.

* * * * *